(12) United States Patent
Gaal et al.

(10) Patent No.: US 7,548,728 B2
(45) Date of Patent: Jun. 16, 2009

(54) CHANNEL QUALITY FEEDBACK MECHANISM AND METHOD

(75) Inventors: Peter Gaal, San Diego, CA (US); Joseph P. Odenwalder, Rancho Santa Fe, CA (US); Stein A. Lundby, Solana Beach, CA (US); David Puig-Oses, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 11/081,330

(22) Filed: Mar. 15, 2005

(65) Prior Publication Data

US 2005/0180450 A1 Aug. 18, 2005

Related U.S. Application Data (62) Division of application No. 10/079,778, filed on Feb. 19, 2002, now Pat. No. 7,050,759.

(51) Int. Cl.
 *H04B 17/00* (2006.01)
(52) U.S. Cl. ............... 455/67.13; 455/67.11; 455/69; 455/63.1; 455/452.2
(58) Field of Classification Search ............ 455/67.11, 455/67.13, 69, 63.1, 450, 452.2; 375/140, 375/141, 142; 370/311, 328
 See application file for complete search history.

(56) References Cited

U.S. PATENT DOCUMENTS

| | | | |
|---|---|---|---|
| 4,901,307 | A | 2/1990 | Gilhousen et al. |
| 5,103,459 | A | 4/1992 | Gilhousen et al. |
| 6,167,031 | A | 12/2000 | Olofsson et al. |
| 6,181,738 | B1 | 1/2001 | Chheda et al. |
| 6,307,849 | B1 | 10/2001 | Tiedemann, Jr. |
| 6,456,598 | B1 * | 9/2002 | Le Strat et al. ............... 370/252 |
| 6,477,355 | B1 | 11/2002 | Grayson et al. |
| 6,574,211 | B2 * | 6/2003 | Padovani et al. ............ 370/347 |

(Continued)

FOREIGN PATENT DOCUMENTS

EP 0954117 11/1999

(Continued)

OTHER PUBLICATIONS

3rd Generation Partnership Project; Technical Specification Group Radio Access Network; Physical channels and mapping of transport channels onto physical channels (FDD); 3GPP TS 25.211 V3.9.0 (Dec. 2001); Release 1999.

(Continued)

*Primary Examiner*—Sanh D Phu
(74) *Attorney, Agent, or Firm*—S. Hossain Beladi; Rupit M. Patel (57) ABSTRACT

Methods and apparatus are presented for improving the feedback of channel information to a serving base station, which allows a reduction in the reverse link load while allowing the base station to improve the forward link data throughput. Over a channel quality indicator channel, three subchannels are generated; the re-synch subchannel, the differential feedback subchannel, and the transition indicator subchannel. The information carried on each subchannel can be used separately or together by a base station to selectively update internal registers storing channel conditions. The channel conditions are used to determine transmission formats, power levels, and data rates of forward link transmissions.

4 Claims, 9 Drawing Sheets

U.S. PATENT DOCUMENTS

| | | | |
|---|---|---|---|
| 7,050,759 B2* | 5/2006 | Gaal et al. | 455/67.13 |
| 2002/0110088 A1* | 8/2002 | Lundby et al. | 370/252 |
| 2002/0136271 A1 | 9/2002 | Hiramatsu et al. | |

FOREIGN PATENT DOCUMENTS

| | | |
|---|---|---|
| EP | 1154665 | 11/2001 |
| JP | 2000134145 | 5/2000 |
| WO | 02/003721 | 1/2002 |
| WO | 02/007372 | 1/2002 |

OTHER PUBLICATIONS

3rd Generation Partnership Project; Technical Specification Group Radio Access Network; Multiplexing and channel coding (FDD); 3GPP TS 25.212 V3.7.0 (Sep. 2001); Release 1999.

3rd Generation Partnership Project; Technical Specification Group Radio Access Network; Spreading and modulation (FDD); 3GPP TS 25.213 V3.7.0 (Dec. 2001); Release 1999.

3rd Generation Partnership Project; Technical Specification Group Radio Access Network; Physical layer procedures (FDD); 3GPP TS 25.214 V3.9.0 (Dec. 2001); Relese 1999.

Advanced Mobile Phone Service Inc., Cellular Mobile Telephone Equipment Specification, Apr. 1983.

TIA/EIA Interim Standard; Mobile Station-Base Station Compatibility Standard For Dual-Mode Wideband Spread Spectrum Cellular System; TIA/EIA/IS-95-A Revision of TIA/EIA/IS-95, May 1995. (Part 1 pp. 1-351).

TIA/EIA Interim Standard; Mobile Station-Base Station Compatibility Standard For Dual-Mode Wideband Spread Spectrum Cellular System; TIA/EIA/IS-95-A Revision of TIA/EIA/IS-95, May 1995. (Part 2 pp. 352-744).

International Search Report PCT/US2003/005373, International Search Authority-European Patent Office, Apr. 8, 2003.

International Preliminary Examination Report PCT/US2003/005373, IPEA, US - Jan. 13, 2006.

* cited by examiner

AT $t_0$, REGISTER CONTENTS = 10dB

+, - → INCREMENTAL BEATS

| | 4A | 4B | 4C | | 4D | |
|---|---|---|---|---|---|---|
| | | | RE-SYNCH OK | RE-SYNCH LOST | ADD | ACC. + ADD |
| $t_0 - t_1$ | 10 | 10 | 10 | | 10 | |
| $t_1 - t_2$ | 11 | 11 | 11 | | 11 | |
| $t_2 - t_3$ | 4 | 11 | 4 | 10 | 10 | 10 |
| $t_3 - t_4$ | 5 | 11 | 5 | 11 | 11 | 11 |
| $t_4 - t_5$ | 4 | 11 | 4 | 10 | 10 | 10 |
| $t_5 - t_6$ | 5 | 4 | 5 | 11 | 4 | 5* |
| $t_6 - t_7$ | 4 | 3 | 4 | 10 | 3 | 4 |

*NOTE THAT 1ST PARALLEL BEAT IS DISCARDED FOR "ACCUMULATE & ADD PARALLEL BEAT IS ACCUMULATE & ADD

FIG. 4E

FIG. 5
(NOT TO SCALE)

FIG. 7
(NOT TO SCALE)

CHANNEL QUALITY FEEDBACK MECHANISM AND METHOD

CLAIM OF PRIORITY UNDER 35 U.S.C. §120

The present Application for Patent is a Divisional and claims priority to patent application Ser. No. 10/079,778 entitled "Improved Channel Quality Feedback Mechanism and Method" filed Feb. 19, 2002, now U.S. Pat. No. 7,050,759 and assignee to the assignee hereof and hereby expressly incorporated by reference herein.

BACKGROUND

1. Field

The present invention relates generally to communications, and more specifically, to improving the feedback of channel information, which can be used to improve the scheduling and rate control of traffic over a wireless communication system.

2. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communication services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA and 3GPP2. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communication systems that can be implemented. Some of these various communication systems are configured so that remote stations can transmit information regarding the quality of the transmission medium to a serving base station. This channel information can then be used by the serving base station to optimize the power levels, the transmission formats, and the timing of forward link transmissions, and further, to control the power levels of reverse link transmissions.

As used herein, "forward link" refers to the transmissions directed from a base station to a remote station and "reverse link" refers to transmissions directed from a remote station to a base station. The forward link and the reverse link are uncorrelated, meaning that observations of one do not facilitate the prediction of the other. However, for stationary and slow-moving remote stations, the characteristics of the forward link transmission path will be observed to be similar to the characteristics of the reverse link transmission path in a statistical sense.

Channel conditions of received forward link transmissions, such as the carrier-to-interference (C/I) ratio, can be observed by a remote station, which reports such information to a serving base station. The base station then uses this knowledge to schedule transmissions to the remote station selectively. For example, if the remote station reports the presence of a deep fade, the base station would refrain from scheduling a transmission until the fading condition passes. Alternatively, the base station may decide to schedule a transmission, but at a high transmission power level in order to compensate for the fading condition. Alternatively, the base station may decide to alter the data rate at which transmissions are sent, by transmitting data in formats that can carry more information bits. For example, if the channel conditions are bad, data can be transmitted in a transmission format with redundancies so that corrupted symbols are more likely to be recoverable. Hence, the data throughput is lower than if a transmission format without redundancies were used instead.

The base station can also use this channel information to balance the power levels of all the remote stations within operating range, so that reverse link transmissions arrive at the same power level. In CDMA-based systems, channelization between remote stations is produced by the use of pseudorandom codes, which allows a system to overlay multiple signals on the same frequency. Hence, reverse link power control is an essential operation of CDMA-based systems because excess transmission power emitted from one remote station could "drown out" transmissions of its neighbors.

In communication systems that use feedback mechanisms to determine the quality of the transmission media, channel conditions are continuously conveyed on the reverse link. This produces a large load upon the system, consuming system resources that could otherwise be allocated to other functions. Hence, there is a need to reduce the reverse link load of unnecessary transmissions, which can occur when the remote stations transmit C/I information that have not changed substantially from the previous transmissions. However, the system must still be able to detect and react to changing channel conditions in a timely manner. The embodiments described herein address these needs by providing a mechanism for optimizing the transmission of channel information on the reverse link and for decoding such information at a base station.

SUMMARY

Methods and apparatus are presented herein to address the needs stated above. In one aspect, an apparatus is presented for scheduling forward link transmissions, the apparatus comprising: a memory element; and a processing element configured to execute a set of instructions stored on the memory element, the set of instructions for: receiving a full channel quality value and a plurality of incremental channel quality values from a remote station, wherein the plurality of incremental channel quality values are received sequentially; and selectively updating a register with a channel quality estimate, wherein the channel quality estimate is based upon the full channel quality value and the plurality of incremental channel quality values.

In another aspect, a method is presented for estimating forward link channel quality from a full channel quality value and a plurality of incremental channel quality values, the method comprising: decoding the full channel quality value over a plurality of slots; incrementally updating a channel state register with the plurality of incremental channel quality values, wherein each of the plurality of incremental channel quality values are received separately over each of the plurality of slots; and resetting the channel state register with the full channel quality value when the full channel quality value is fully decoded.

In another aspect, an apparatus is presented for transmitting channel quality values over a feedback channel to a base station, the apparatus comprising: a re-synch subchannel generation system for generating full channel quality values; and a differential feedback subchannel generation system for generating a plurality of incremental values, wherein the plurality of incremental values are multiplexed with the full channel quality values.

In another aspect, a method is presented for transmitting channel information from a remote station to a base station, the method comprising: generating a full channel quality value; and generating an incremental channel quality value, wherein the incremental channel quality value is multiplexed with the full channel quality value.

DETAILED DESCRIPTION

Figure 1:
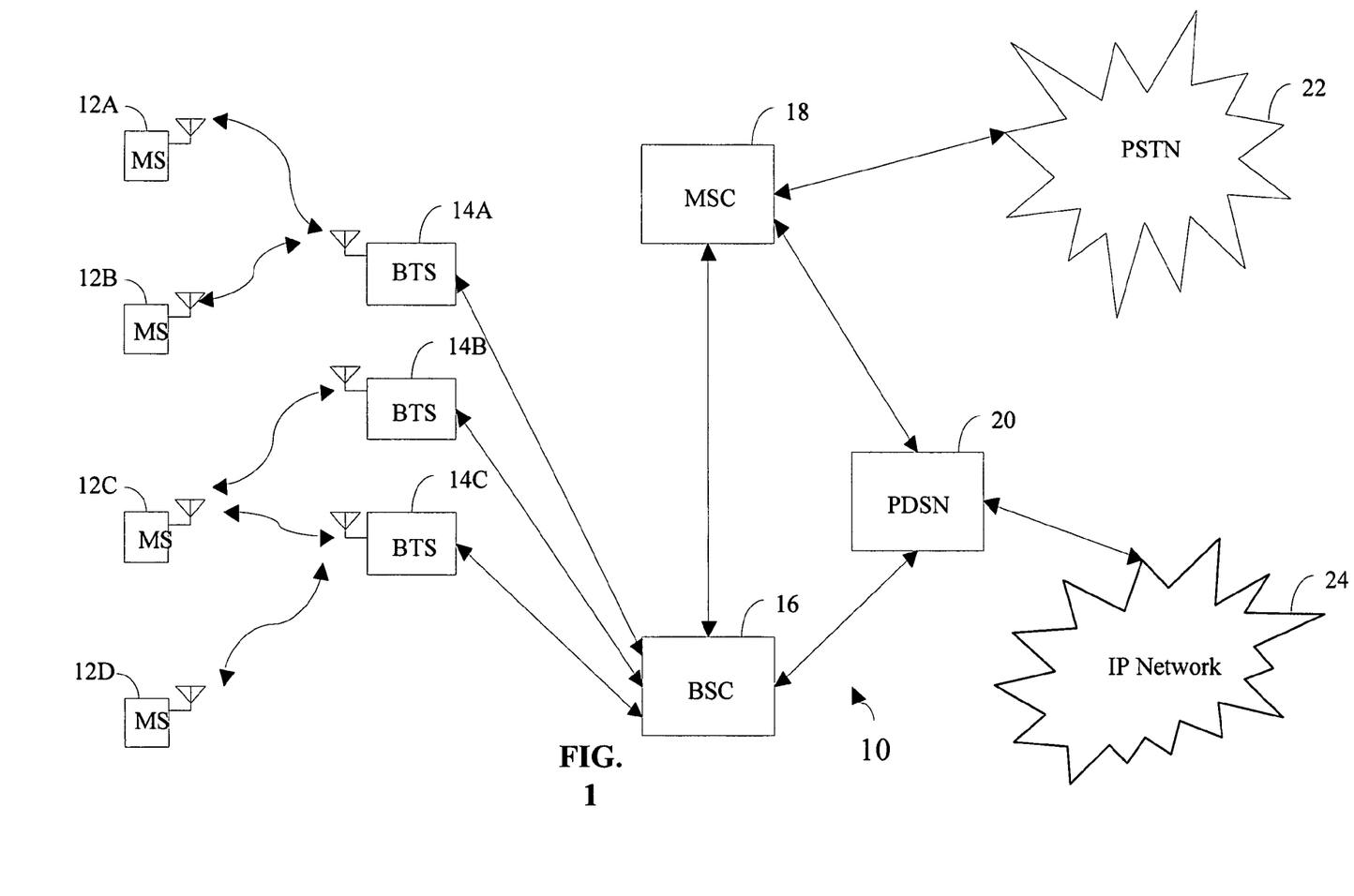
FIG. 1 is a diagram of a wireless communication network.

As illustrated in FIG. 1, a wireless communication network 10 may generally includes a plurality of mobile stations (also called remote stations or subscriber units or user equipment) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be more or less number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may advantageously be configured to perform one or more wireless packet data protocols such as described in, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 can be coupled directly to the PDSN 20.

During typical operation of the wireless communication network 10, the base stations 14a-14c receive and demodulate sets of reverse signals from various mobile stations 12a-12d engaged in telephone calls, Web browsing, or other data communications. Each reverse signal received by a given base station 14a-14c is processed within that base station 14a-14c. Each base station 14a-14c may communicate with a plurality of mobile stations 12a-12d by modulating and transmitting sets of forward signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used hereafter. Such use is not intended to limit the implementation of the embodiments herein to cdma2000 systems. Implementations in other systems, such as, e.g., WCDMA, can be accomplished without affecting the scope of the embodiments described herein.

The forward link from the base station to a remote station operating within the range of the base station can comprise a plurality of channels. Some of the channels of the forward link can include, but are not limited to a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, and packet data channel. The reverse link from a remote station to a base station also comprises a plurality of channels. Each channel carries different types of information to the target destination. Typically, voice traffic is carried on fundamental channels, and data traffic is carried on supplemental channels or packet data channels. Supplemental channels are usually dedicated channels, while packet data channels usually carry signals that are designated for different parties in a time and/or code-multiplexed manner. Alternatively, packet data channels are also described as shared supplemental channels. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, an identification of the orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh code sequences, are used to channelize the information sent to each remote station. In other words, Walsh code sequences are used on the forward link to allow the system to overlay multiple users, each assigned one or several different orthogonal or quasi-orthogonal codes, on the same frequency during the same time duration.

A scheduling element in the base station is configured to control the transmission format of each packet, the rate of each packet, and the slot times over which each packet is to be transmitted to a remote station. The terminology "packet" is used to describe system traffic. Packets can be divided into subpackets, which occupy slots of a transmission channel. "Slot" is used to describe a time duration of a message frame. The use of such terminology is common in cdma2000 systems, but the use of such terminology is not meant to limit the implementation of the embodiments herein to cdma2000 systems. Implementation in other systems, such as, e.g. WCDMA, can be accomplished without affecting the scope of the embodiments described herein.

Scheduling is a vital component in attaining high data throughput in a packet-based system. In the cdma2000 system, the scheduling element (which is also referred to as a "scheduler" herein) controls the packing of payload into redundant and repetitious subpackets that can be soft-combined at a receiver, so that if a received subpacket is corrupted, it can be combined with another corrupted subpacket to determine the data payload within an acceptable frame error rate (FER). For example, if a remote station requests the transmission of data at 76.8 kbps, but the base station knows that this transmission rate is not possible at the requested time due to the condition of channel, the scheduler in the base station can control the packaging of the data payload into multiple subpackets. The remote station will receive multiple corrupted subpackets, but will still be likely to recover the data payload by soft-combining the uncorrupted bits of the subpackets. Hence, the actual transmission rate of the bits can be different from the data throughput rate.

The scheduling element in the base station uses an open-loop algorithm to adjust the data rate and scheduling of forward link transmissions. The open-loop algorithm adjusts transmissions in accordance with the varying channel conditions typically found in a wireless environment. In general, a remote station measures the quality of the forward link channel and transmits such information to the base station. The base station uses the received channel conditions to predict the most efficient transmission format, rate, power level and timing of the next packet transmission. In the cdma2000 1xEV-DV system, the remote stations can use a channel quality feedback channel (CQICH) to convey channel quality measurements of the best serving sector to the base station. The channel quality may be measured in terms of a carrier-in-interference (C/I) ratio and is based upon received forward link signals. The C/I value is mapped onto a five-bit channel quality indicator (CQI) symbol, wherein the fifth bit is reserved. Hence, the C/I value can have one of sixteen quantization values.

Since the remote station is not prescient, the remote station transmits the C/I values continuously, so that the base station is aware of the channel conditions if ever any packets need to be transmitted on the forward link to that remote station. The continuous transmission of 4-bit C/I values consumes the battery life of the remote station by occupying hardware and software resources in the remote station.

In addition to the problems of battery life and reverse link loading, there is also a problem of latency. Due to propagation and processing delays, the base station is scheduling transmissions using outdated information. If the typical propagation delay is 2.5 ms in duration, which corresponds to a 2-slot delay in systems with 1.25 ms slots, then the base station may be reacting to a situation that no longer exists, or may fail to react in a timely manner to a new situation.

For the above reasons, the communication network requires a mechanism to convey information to the base station that allows the base station to quickly reschedule transmissions due to sudden changes in the channel environment. In addition, the aforementioned mechanism should reduce the drain on battery life of the remote station and the load on the reverse link.

The embodiments described herein are directed to improving the feedback mechanism for conveying channel information, such as C/I, from the remote station to the base station while reducing the load of the reverse link. By improving the feedback mechanism, the embodiments improve the ability of a base station to schedule transmissions and the data rates of the transmissions in accordance with actual channel conditions. The embodiments are directed toward generating two subchannels on the CQI channel in order to carry channel information. It should be noted that other channels could also be configured to carry the subchannels described herein, but for the sake of expediency, the terminology of the CQI channel is used henceforth. The two subchannels are referred to hereafter as the re-synch subchannel and the differential feedback subchannel.

In addition to improvements in the feedback mechanism at the remote station, improvements at the base station can also be implemented to optimize the interpretation of the channel information received from the remote station. A scheduling element in the base station can be configured to implement task functions in accordance with information received from either subchannel or by selectively discarding information received from either subchannel.

In a general description of the embodiments, full C/I values are transmitted on the re-synch subchannel while incremental 1-bit values are transmitted over the differential feedback subchannel. The incremental 1-bit values of 1 and 0 are mapped to +0.5 dB and −0.5 dB, but can be mapped to other values ±K as well, where K is a system defined step size.

Generation of Subchannels at a Remote Station

The values sent on the re-synch and differential feedback subchannels are determined based on the forward link C/I measurements. The value sent on the re-sync subchannel is obtained by quantizing the most recent C/I measurement. A one-bit value is sent on the differential feedback subchannel and is obtained by comparing the most recent C/I measurement with the contents of an internal register. The internal register is updated based on past values sent on the re-synch and differential feedback subchannels, and represents the remote station's best estimate of the C/I value that the base station will decode.

Figure 2A:
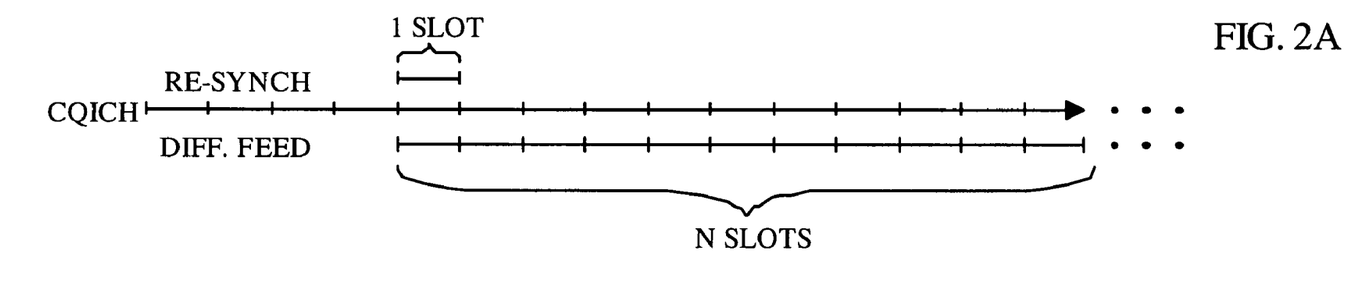
FIG. 2A, FIG. 2B, and FIG. 2C are timelines that describe the interactions between the re-synch subchannel and the differential feedback subchannel.

In a first mode, channel elements can be placed within a remote station to generate the re-synch subchannel and the differential feedback subchannel over the CQI channel (CQICH), wherein the re-synch subchannel occupies one slot of an N-slot CQICH frame and the differential feedback subchannel occupies all slots of the N-slot CQICH frame, so that an incremental 1-bit value is transmitted in each slot. Hence, in at least one slot of the N-slot CQICH frame, both a full C/I value and an incremental 1-bit value are transmitted to the base station. This concurrent transmission is possible through the use of orthogonal or quasi-orthogonal spreading codes, or in an alternative embodiment, by time interleaving the two subchannels in some predetermined fashion. In an alternate first mode, the re-synch subchannel and the differential feedback subchannel are not sent in parallel. Instead, the re-synch subchannel is transmitted over one slot and the system refrains from transmitting the differential feedback subchannel in that particular slot. FIG. 2A is a timeline illustrating the transmission timing of the re-synch channel and the differential feedback subchannel operating in parallel in the first mode.

In a second mode, the channel elements are configured so that the two subchannels are generated with the re-synch subchannel operating at a reduced rate. The re-synch channel operates at a reduced rate when a full C/I value is spread over at least two slots of an N-slot CQICH frame. For example, the full C/I value may be transmitted at a reduced rate over 2, 4, 8, or 16 slots of a 16-slot CQICH frame. The differential feedback subchannel occupies all of the slots of the N-slot CQICH frame. Hence, an incremental 1-bit value is transmitted in each slot, in parallel to the re-synch subchannel. The remote station should transmit the full C/I value at the reduced rate when the reverse link is suffering from unfavorable channel conditions. In one embodiment, the base station determines the reverse link channel conditions and transmits a control signal to the remote station, wherein the control signal informs the remote station as to whether the re-synch subchannel should operate at a reduced rate or not. Alternatively, the remote station can be programmed to make this determination independently.

Figure 2B:
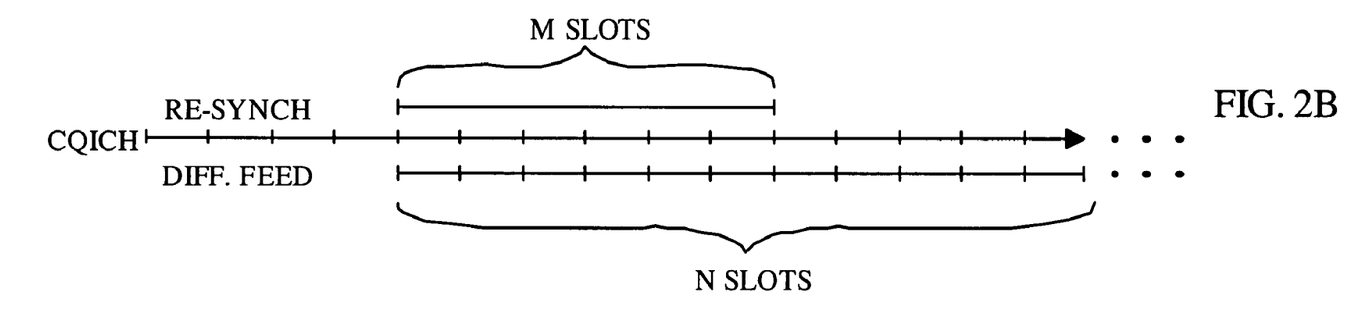
Figure 2C:
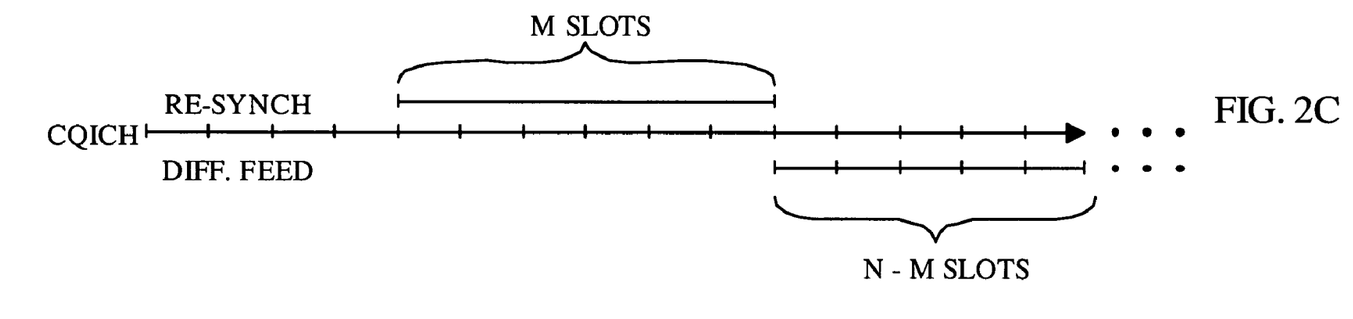

In one implementation of the second mode, the two subchannels work parallel at a reduced rate wherein a full C/I value is spread over all slots of a N-slot CQICH frame and each slot also carries an incremental 1-bit value. In an alternate second mode, the differential feedback subchannel occupies all of the slots of the N-slot frame except for the first slot. In yet another alternate second mode, the differential feedback subchannel and the re-synch subchannel are not sent in parallel at all; the re-synch subchannel operates first over M slots, and the differential feedback subchannel operates over the next N-M slots of the N-slot frame. FIG. 2B and FIG. 2C are timelines illustrating the transmission timing of the re-synch subchannel and the differential feedback subchannel operating in the second mode. The internal register of the remote station may be updated in the first, second or $M^{th}$ slot, depending on which operating mode is in use.

In another embodiment, the full C/I value can also be sent at unscheduled slots, whenever the remote station determines that the C/I estimate kept at the base station is out of synchronization. This embodiment requires that the base station continuously monitors the CQICH to determine whether an unscheduled full C/I value symbol is present or not.

In yet another embodiment, the full C/I value is only sent when the remote station determines that the C/I estimate kept at the base station is out of synchronization. In this embodiment, the full C/I value is not sent at regularly scheduled intervals.

Interpretation of Subchannel Information at a Base Station

A scheduling element in a base station can be configured to interpret channel information received on the re-synch subchannel and the differential feedback subchannel, wherein the channel information from each subchannel is used to make transmission decisions that account for the state of the channel. The scheduling element can comprise a processing element coupled to a memory element, and is communicatively coupled to the receiving subsystem and the transmission subsystem of the base station.

Figure 3:
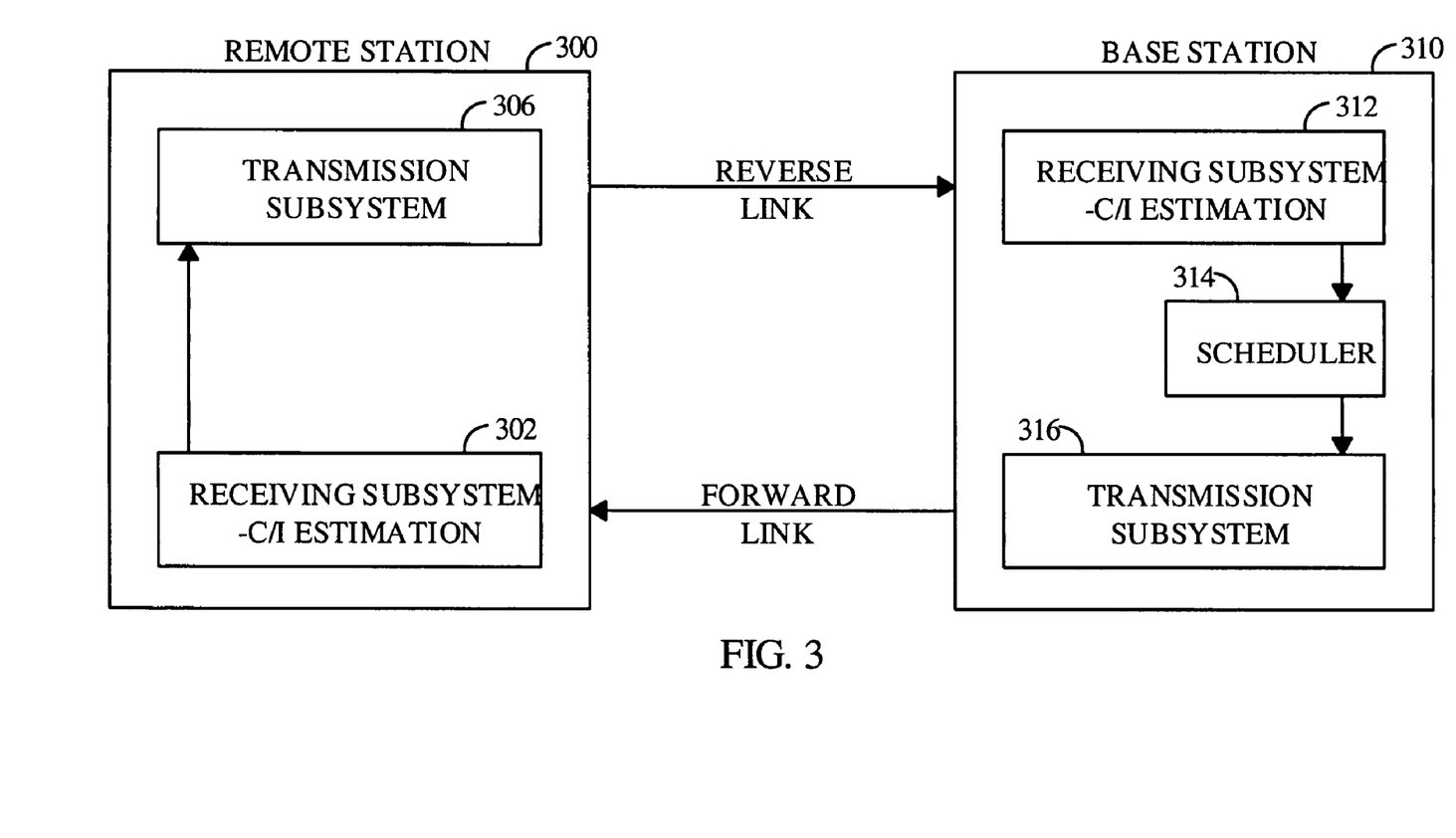
FIG. 3 is a functional block diagram of a remote station in communication with a base station.

FIG. 3 is a block diagram of some of the functional components of a base station with a scheduling element. A remote station 300 transmits on the reverse link to a base station 310. At a receiving subsystem 312, the received transmissions are de-spread, demodulated and decoded. A scheduler 314 receives a decoded C/I value and orchestrates the appropriate transmission formats, power levels, and data rates of transmissions from the transmission subsystem 316 on the forward link.

Figure 6A:
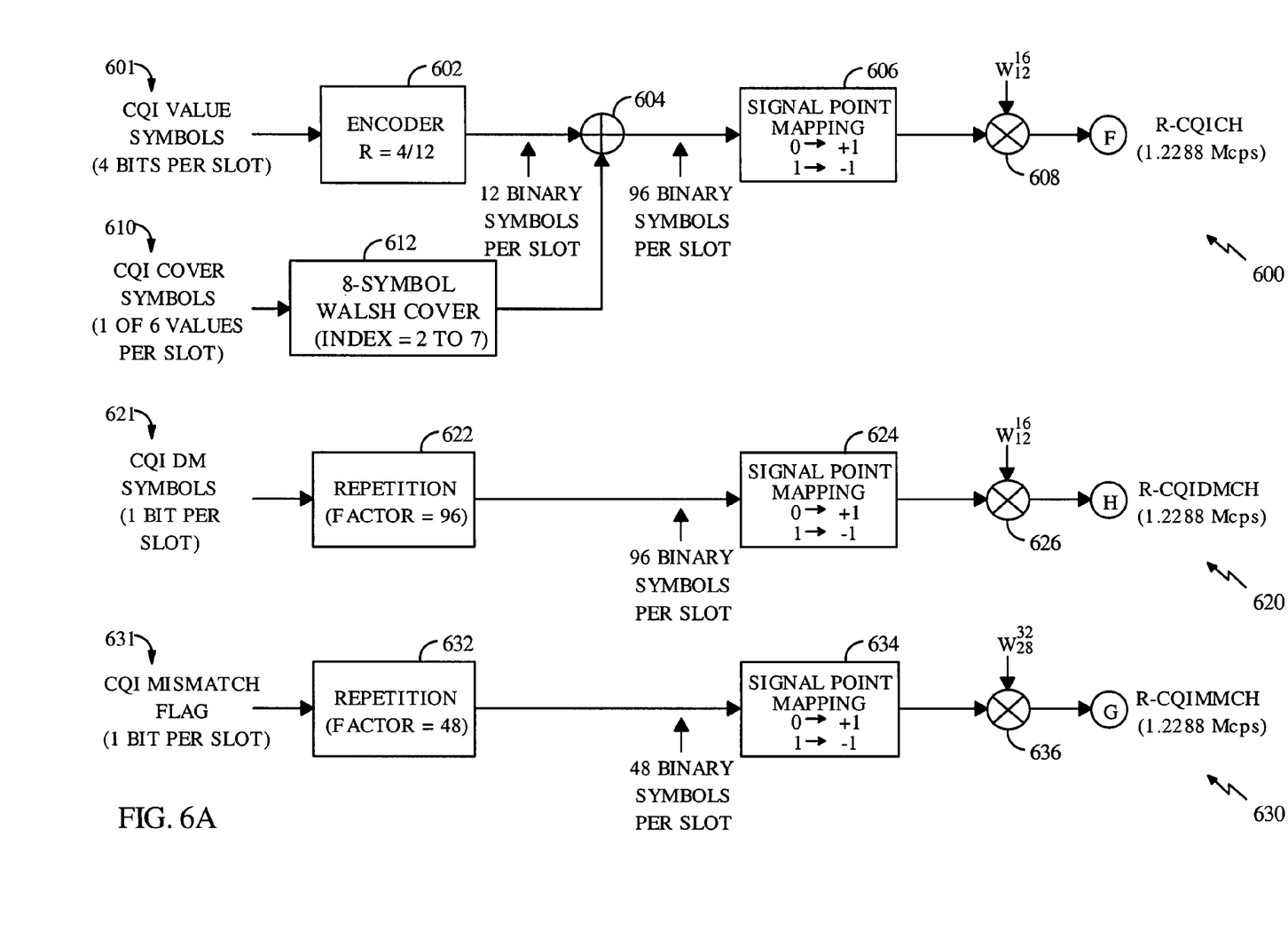
FIG. 6A and FIG. 6B are block diagrams of channel elements for generating re-synch subchannel, the differential feedback subchannel, and the transition indicator subchannel.
Figure 6B:
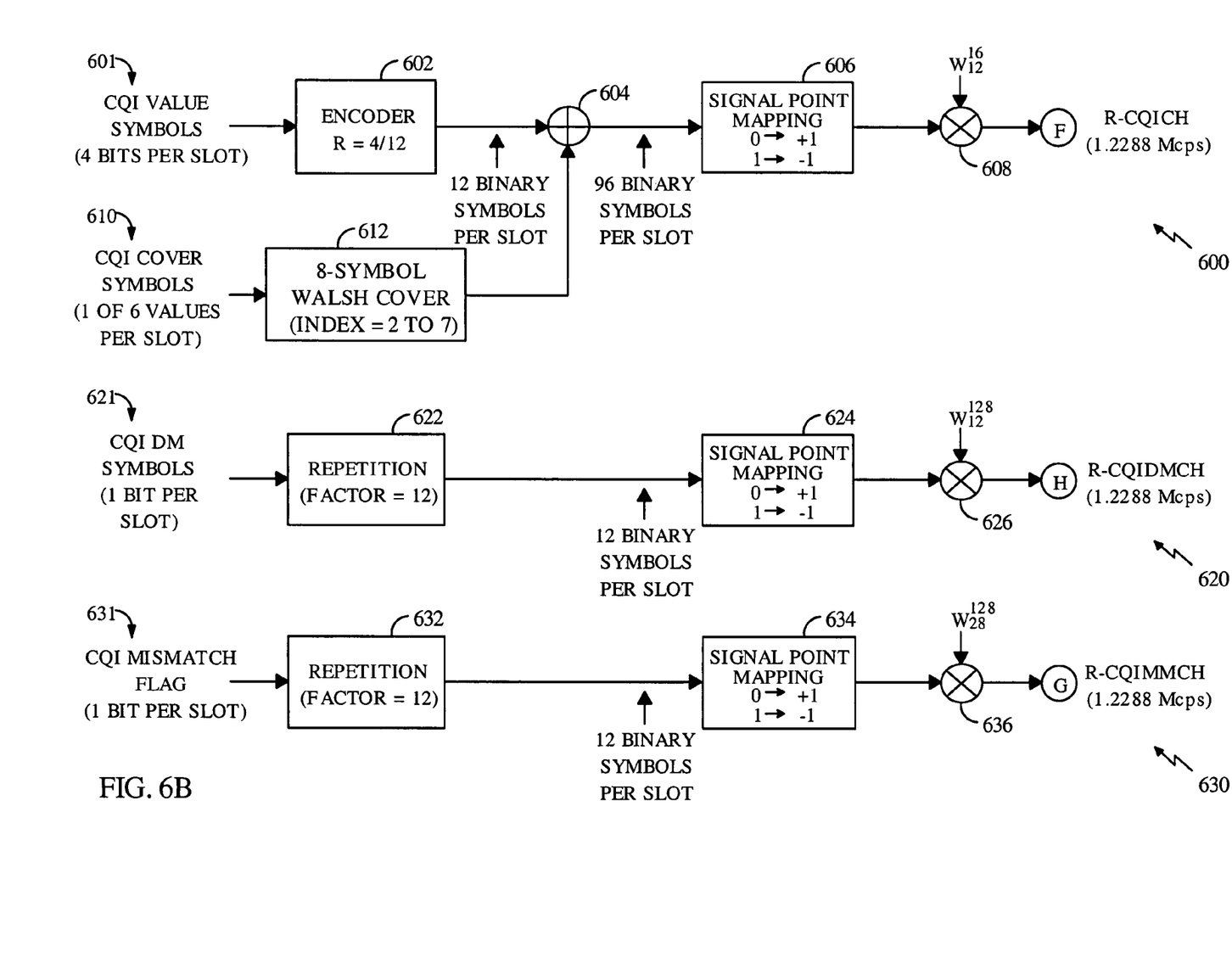

At the remote station 300, a receiving subsystem 302 receives the forward link transmission and determines the forward link channel characteristics. A transmission subsystem 306, in which the channel elements described by FIGS. 6A and 6B are located, transmits such forward link channel characteristics to the base station 310.

In the embodiments described herein, the scheduling element 314 can be programmed to interpret the channel information received on the re-synch subchannel together with the channel information received on the differential feedback subchannel, or to interpret the channel information received on the re-synch subchannel separately from the channel information received on the differential feedback subchannel. The scheduling element can also be configured to perform a method to alternate which subchannel will be used to update channel information.

When the remote station transmits the channel information using the first mode, a serving base station will receive the full C/I value over one slot and incremental values over all slots of the frame. In one embodiment, the scheduler can be programmed to reset internal registers that store the current state of the channel, wherein the registers are reset with the full C/I value received over one slot of the re-synch subchannel. The incremental values received over the different feedback subchannel are then added upon receipt to the full C/I value stored in the register. In one aspect, the incremental value that is transmitted concurrently over the slot with the full C/I value is intentionally discarded, since the full C/I value already accounts for this incremental value.

When a remote station is operating in the second mode, a serving base station will receive the full C/I value over multiple slots and incremental values over all slots of the frame. In one embodiment, the serving base station estimates the channel conditions at the time that is scheduled for a packet transmission by accumulating the incremental values received on the differential feedback subchannel from the second slot to the $M^{th}$ slot, where M is the number of slots over which the full C/I value is spread out. This accumulated value is then added to the full C/I value, which was received on the re-synch subchannel over the M slots. In another embodiment, this "accumulate and add" method can be performed concurrently with an independent action for "up-down" bits, which updates the C/I value stored in the register as directed by the incremental values. Hence, the register storing the current channel condition information is updated each time an incremental value is received, and the register is then updated with the accumulated value added to the full C/I value.

Figure 4A:
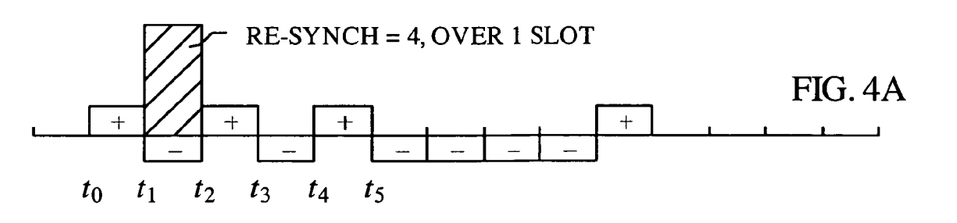
FIG. 4A, FIG. 4B, FIG. 4C, and FIG. 4D are timelines of different implementations of the re-synch subchannel and the differential feedback subchannel.

FIGS. 4A, 4B, 4C and 4D are timelines describing the embodiments above. FIG. 4E is a table of C/I values stored in a register at a given point in the timelines, using the embodiments described above. In the timeline of FIG. 4A, the remote station is transmitting the re-synch subchannel over a single slot of the CQICH frame and the differential subchannel over each slot of the CQICH frame. The base station is configured to update the register that stores the channel state such that parallel incremental values are discarded, i.e., the parallel incremental values are not used to update the register. Hence, at the interval $t_2$-$t_3$, the channel state information stored in the register is 4 dB, which is the full C/I value transmitted on the re-synch subchannel over interval $t_1$-$t_2$. The contribution of the differential feedback channel at interval $t_1$-$t_2$ is discarded.

Figure 4B:
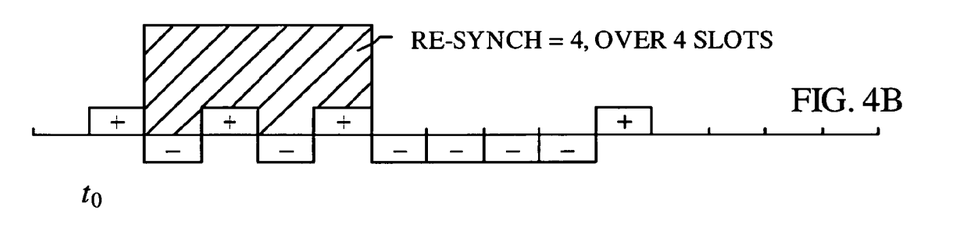

In the timeline of FIG. 4B, the remote station is transmitting the re-synch subchannel over multiple slots (4 slots in this example) and the differential subchannel over each slot of the CQICH frame. Again, the base station is configured to update the register that stores the channel state such that parallel incremental values are discarded. Hence, at the interval $t_1$-$t_5$, the channel state information stored in the register is 11 dB, which is the value of the different feedback subchannel over interval $t_0$-$t_1$ added to the stored value in the register. The register is not updated with the value carried by the re-synch subchannel until $t_5$, which is the instance when the re-synch C/I value has been fully received.

Figure 4C:
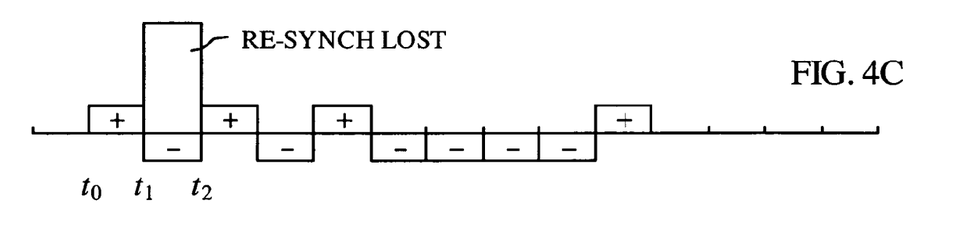

In the timeline of FIG. 4C, the remote station is transmitting the re-synch subchannel over a single slot and the differential subchannel over each slot of the CQICH frame. In this example, one of the benefits of the embodiments described herein can be shown clearly. From interval $t_0$-$t_1$, the last value in the register is 10 dB. From interval $t_1$-$t_2$, the value in the register is 11 dB. If the re-synch subchannel can be decoded correctly, then the register values over the intervals $t_2$-$t_3$ and $t_3$-$t_4$ would be the same as for the timeline in FIG. 4A. However, if the re-synch subchannel cannot be decoded correctly, then the register values over the intervals $t_2$-$t_3$ and $t_3$-$t_4$ would be 10 dB and 11 dB, respectively, rather than 4 dB and 5 dB. Even though the full C/I value is lost on the re-synch subchannel, the incremental values received on the differential feedback subchannel can still be used to update the register. Hence, the differential feedback subchannel can be used independently of the re-synch subchannel to update the channel state information registers.

Figure 4D:
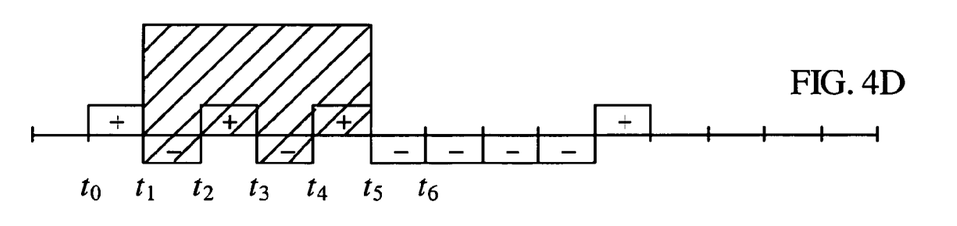
Figure 4E:
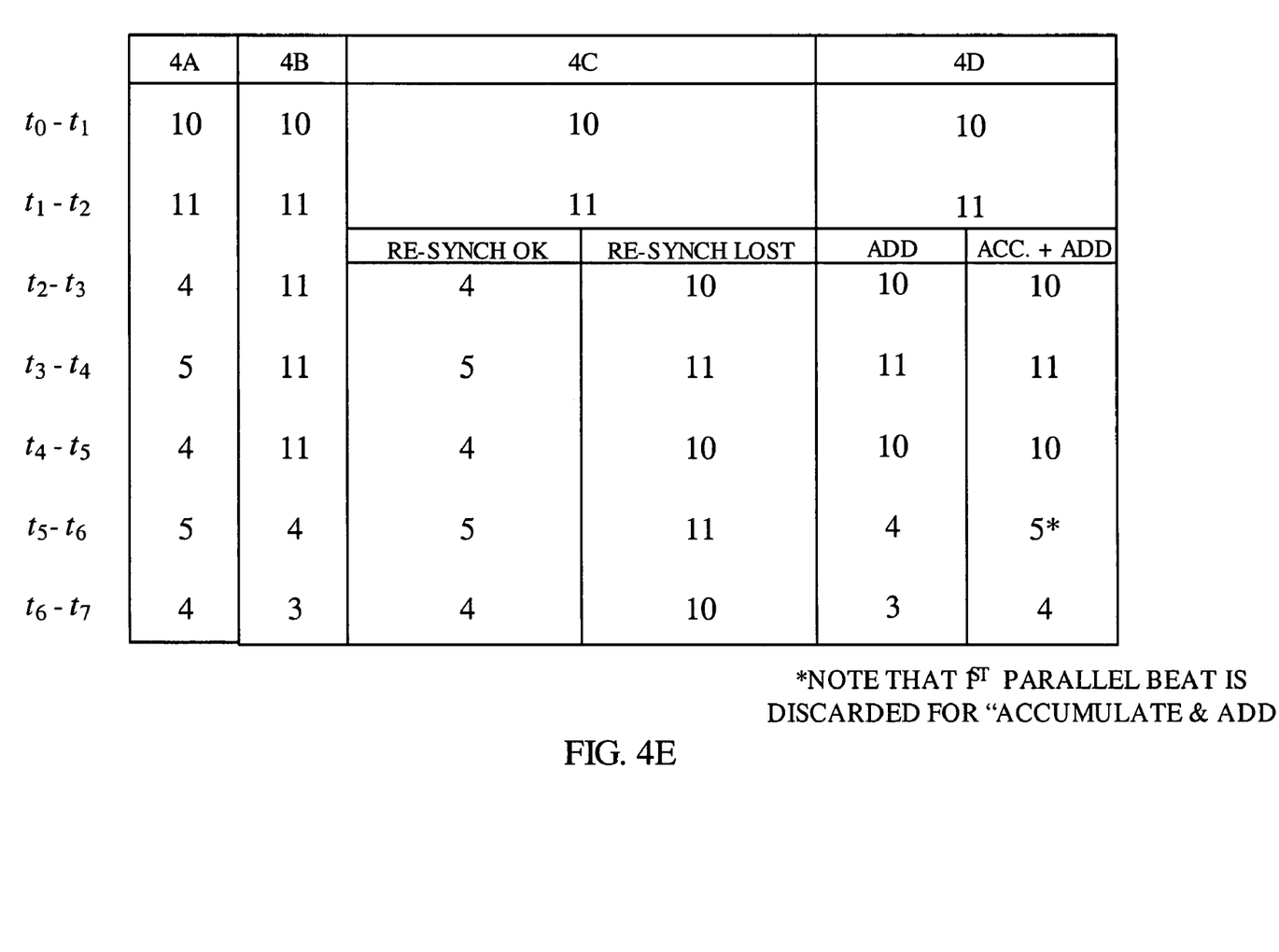
FIG. 4E is a table illustrating different values arising from different interpretations of the information received on the re-synch subchannel and the differential feedback subchannel.

In the timeline of FIG. 4D, the remote station is transmitting the re-synch subchannel over multiple slots (4 slots in this example) and the differential subchannel over each slot of the CQICH frame. The base station is configured to update the register that stores the channel state, wherein the update accounts for the addition of parallel incremental values to the stored C/I re-synch value, as each incremental value arrives at the base station.

In an alternative embodiment, the base station can be configured to update the register that stores the channel state, wherein the update includes the accumulation of the parallel incremental values that is then added to the stored C/I re-synch value. In particular, the accumulate and add is performed using all incremental values except for the incremental value transmitted in the first shared slot with the full C/I value. Each parallel incremental value is added to the stored C/I re-synch value as each arrives, and the aggregate of the incremental values, except the first, is added to the newly received C/I value at $t_5$.

Figure 5:
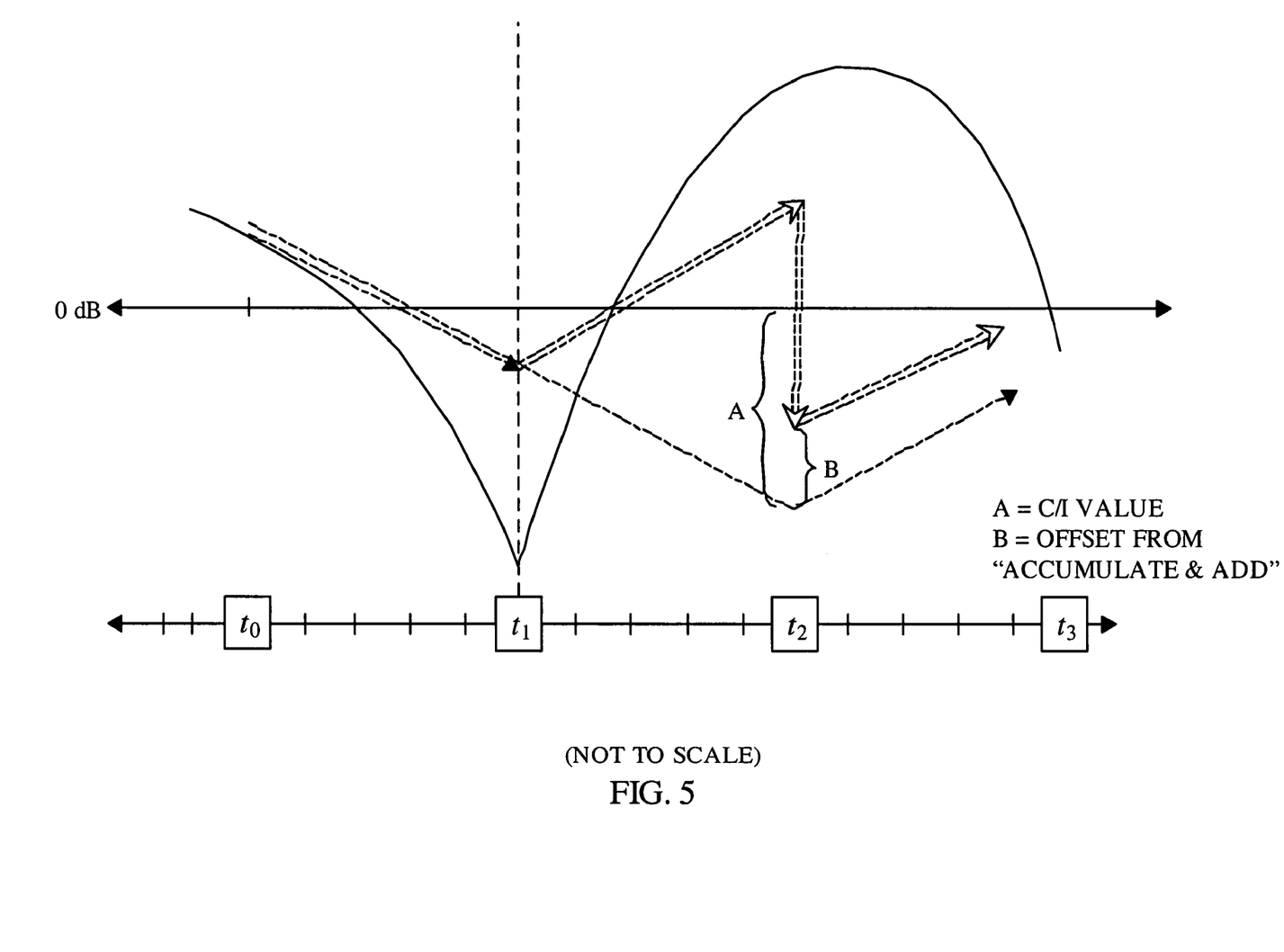
FIG. 5 is a graph illustrating an advantage of the "accumulate and add" method when a deep fade occurs.

The embodiments described above serve the practical purpose of allowing the base station to more closely model the event of a deep fade. Rayleigh fading, also known as multipath interference, occurs when multiple copies of the same signal arrive at the receiver in a destructive manner. Substantial multipath interference can occur to produce flat fading of the entire frequency bandwidth. If the remote station is traveling in a rapidly changing environment, deep fades could occur at scheduled transmission times. When such a circumstance occurs, the base station requires channel information that allows it to reschedule transmissions quickly and accurately. In the second mode, the base station receives a reduced rate C/I value over more than one slot, but the base station can still compensate for the fade before the C/I value is fully received over the multiple slots. FIG. 5 is a deep fading curve superimposed over a timeline that can be used to illustrate the purpose of this embodiment.

At time $t_0$, a deep fading condition commences. Due to incremental step commands, the base station slowly models the fade, as shown by the double-dashed line. At time $t_1$, the remote station transmits a measured C/I ratio at a reduced rate over multiple slots of the re-synch subchannel. The remote station concurrently transmits incremental "up" commands on each slot to the base station. The base station starts demodulating and decoding the C/I value on the re-synch subchannel. Since the 1-bit "up" command is relatively simple to demodulate and decode, the base station can immediately start modeling the fade using the received up commands. At time $t_2$, wherein the C/I value is fully processed, the base station resets its estimate of the channel conditions.

As shown by FIG. 5, without the use of the differential feedback channel, the base station would have continued to pursue a model of channel conditions that is sub-optimal. Rather than a model with a positive slope between the points $t_1$ and $t_2$, the model would have had a negative slope between points $t_1$ and $t_2$. Moreover, using the "accumulate and add" method, the base station would be able to estimate a higher value of the channel state than the one already provided by the remote station. Hence, the base station would have had a model that would be less accurate then the model created by the current embodiments.

The use of two subchannels as described above allows the base station to react to the changing environment in which the remote station is operating while minimizing the reverse link load. The reverse link load is reduced because the majority of the slots will be carrying fewer information bits than continuous transmissions of full C/I values. For example, in the case of the second mode, one full C/I value is being conveyed over all N slots of the CQICH frame, rather than the transmission of N full C/I values over N slots.

FIG. 6A is a block diagram of channel elements that can implement the modes described above in a cdma2000 1xEV-DV system. C/I ratio values 601 are input into an encoder 602 at rate R=4/12 so that 12 binary symbols are generated for each slot. The 12 binary symbols are spread with a Walsh code generated by a covering element 612. Covering element 612 selects one of six allowed spreading Walsh sequences based on cover symbols 610 to indicate the index of the serving base station. The output of the covering element 612 and the encoder 602 are combined by an adder 604 to form 96 binary symbols per slot. The output from the adder 604 is mapped in a mapping element 606 and then spread by a Walsh spreading element 608 to generate the re-synch subchannel 600. Concurrently, incremental 1-bit values 621 are input into a repeater 622 to form 96 binary symbols per slot. The repeated symbols are mapped in a mapping element 624 and then spread by a Walsh spreading element 626 to form the differential feedback subchannel 620. The symbols sent on the re-synch and the differential feedback subchannels are transmitted at a rate of 1.2288 Mcps.

FIG. 6B is an alternate configuration wherein the concurrent incremental 1-bit values 621 are input into a repeater 622 to form 12 binary symbols per slot. The rationale for this alternate configuration is discussed below in conjunction with the new transition indicator subchannel 630.

Base Station Index Indicator

The Walsh spreading introduced by covering element 612 of FIG. 6A serves the purpose of indicating the best base station detected by the remote station, i.e. the base station with the highest forward link C/I value, for the purposes of packet-based transmissions. It should be noted that the process of choosing a best base station for packet-based transmissions on a data traffic channel is different from the process of choosing the best base station for voice transmissions on a fundamental channel. For a voice transmission, a remote station that transitions from the range of a first base station to a second base station will exchange voice traffic with both base stations at the same time in a process called soft handoff. Each base station operating within the network is assigned a 20-bit identification value, and is ranked in groups referred to as the active set, the candidate set, the neighbor set, and the remaining set. Due to the variable nature of wireless medium, the ranking of base stations is a dynamic process.

The embodiments described herein are directed to data traffic channels that exchange packets directed to individual base stations, due to the nature of addressed packet data. In order to select the best base station to serve the remote station, the remote station monitors forward link signals from all base stations in a designated "active set." As used herein, the "active set" for a packet-based transmission differs from the "active set" for a voice transmission.

Each member of the active set is assigned a different 3-bit index, which is conveyed to the remote station from the serving base station through signaling messages. The Walsh code to be used by covering element 612 is selected based on the index corresponding to the best base station in the active set. In FIG. 6A and FIG. 6B, the Walsh spreading is applied only to the re-synch subchannel and not to the differential feedback subchannel. This embodiment has the advantage of conserving Walsh-space, since only differential subchannel symbols are sent for a majority of the slots. Thus, the Walsh functions are used infrequently and are resources that can be directed to other purposes. In one aspect of this embodiment, the extra Walsh function is applied to a transition indicator subchannel, which is described below.

In another embodiment, the Walsh spreading is applied to both the re-synch subchannel and the differential feedback subchannel, thus the base station index indicator can be extracted from either.

In another embodiment, one of the Walsh functions is reserved for spreading the differential feedback subchannel symbols, while the remaining Walsh functions are used for spreading the re-synch subchannel symbols to indicate the best base station index. This embodiment has the disadvantage of reducing the number of available active set base station indices by one. However, this embodiment provides for straightforward, concurrent use of the re-synch subchannel and the differential feedback subchannel, since they are spread with mutually orthogonal codes.

As a further advantage, when the new best base station is a different sector of the current serving base station, then the switching of sectors can be immediate. The remote station can start sending re-synch subchannel and differential feedback subchannel symbols corresponding to the new best base station immediately.

When the new best base station is a sector of a different base station, a transitional period for allowing a new forward link to be set up is desirable. In one embodiment, channel elements are configured to generate a transition indicator subchannel. The transition indicator subchannel is set up so that a remote station can generate re-synch subchannel symbols and differential feedback subchannel symbols that correspond to the current base station's C/I value. This allows the remote station to utilize the existing forward link from the current base station. The transition indicator subchannel is shown in FIG. 6A and FIG. 6B. Concurrent to the re-synch subchannel and the differential feedback subchannel, mismatch flag bits 631 are input into a repeater 632 to form 48 binary symbols per slot in FIGS. 6A and 12 binary symbols per slot in the alternate configuration of FIG. 6B. The repeated symbols are mapped in a mapping element 634 and then spread by a Walsh spreading element 636 to form the transition indicator subchannel 630. FIG. 6A illustrates a transition indicator subchannel with Walsh function $W_{28}^{38}$, while FIG. 6B illustrates a transition indicator subchannel with Walsh function $W_{28}^{128}$. The symbols sent on this subchannel are transmitted at a rate of 1.2288 Mcps.

The transition indicator subchannel indicates the start of a transitional period to the current base station. The transitional period is indicated by setting a bit in the transition indicator subchannel. The transition indicator subchannel may be transmitted in a code-multiplexed or time-multiplexed fashion. Code-multiplexing of the transition indicator subchannel with other existing subchannels may be performed through the use of a reserved Walsh spreading function.

In one embodiment, the transitional period is indicated by using a Walsh spreading function that is the inverse of the Walsh spreading function assigned to a base station in the non-transitional case. As used herein, the inverse means using '0' in place of '1' and using '1' in place of '0' in the Walsh sequence. This embodiment requires that the union of the set of all code words generated by encoder 602 of FIG. 6A or FIG. 6B and the set of inverses of all such code words forms a codebook that has satisfactory minimum distance properties. To achieve this, an appropriate encoder 602 must be used. One such possible encoder is obtained by puncturing the first four bits of a standard 16×16 Walsh code.

In one embodiment, all re-synch subchannel symbols are transmitted at a reduced rate throughout the switching period to aid reliable detection of the switch from the current base station to a new base station. To improve time diversity in fading channels, the reduced rate repetitions may be performed in non-consecutive slots. This aspect of the embodiment reduces C/I tracking performance by introducing additional delays in the full C/I update, but increases the reliability of detecting the base station index indicator, which is of higher importance.

Interpretation of Subchannel Information at Quantization Limits

As stated above, the C/I value is transmitted as 4 bits of information; hence, there are only 16 possible values for the C/I value. The dynamic range of this quantization scheme is a system-defined parameter that can be altered without affecting the scope of the embodiments, i.e., more or less bits can be allocated for the dynamic range of the C/I values. As one illustrative example, one quantization scheme can be defined as having a minimum bit sequence value "0000" set equal to −15.5 dB and a maximum bit sequence value "1111" set equal to 5.5 dB. A question arises as to the appropriate course of action at these two extremes.

Using the above embodiments, if the channel conditions are extremely favorable at 8 dB over a long period of time, then the only value that the re-synch subchannel can transmit is 5.5 dB. The remote station can attempt to compensate for this lack by transmitting incremental "up" bits to the base station. However, the base station is not likely to take different actions for a channel condition of 5.5 dB versus 8 dB. Moreover, the decoding errors accumulated during the "above the limit" period will add to the tracking error even after the C/I value drops below the maximum quantization level.

In one aspect of the embodiments above, the base station can deliberately ignore the values received on the differential feedback subchannel when a threshold C/I value is reached and a predetermined pattern of transmissions on the differential feedback subchannel is detected. In one example, a remote station determines that the condition of the forward link is better than the maximum quantization value and so transmits the maximum quantization value over the re-synch subchannel. In addition, the remote station deliberately transmits up bits to the serving base station throughout the duration that this favorable channel condition exists. The transmission of up bits only is contrary to the practice of transmitting up and down bits to track the slope of the fading curve. Referring back to FIG. 5, if the fading curve is above the threshold amount at intervals $t_1$-$t_3$, then up bits would have been sent in interval $t_1$-$t_2$, and down bits would have been sent in interval $t_2$-$t_3$. However, using the embodiment described herein, only up bits would have been sent in the intervals $t_1$-$t_2$ and $t_2$-$t_3$.

The base station decodes the full C/I value on the re-synch subchannel and determines that the full C/I value is equal to the threshold value, which corresponds to the maximum value of the dynamic range. If the base station then receives any up bits, the base station is programmed to refrain from updating the registers that store the current channel conditions until a full C/I value is received that is not the threshold value. However, if the base station receives down bits, then the base station updates the registers accordingly.

In an additional embodiment, the remote station determines that the condition of the forward link is worse than the minimum quantization value and so transmits the minimum quantization value over the re-synch subchannel. In addition, the remote station deliberately transmits down bits to the serving base station throughout the duration that this unfavorable channel condition exists. The base station decodes the full C/I value on the re-synch subchannel and determines that the full C/I value is equal to the threshold value, which corresponds to the minimum value of the dynamic range. If the base station then receives any down bits, the base station is programmed to refrain from updating the registers that store the current channel conditions until another full C/I value is received that does not match the threshold value. However, if the base station receives up bits, then the base station updates the registers accordingly.

Figure 7:
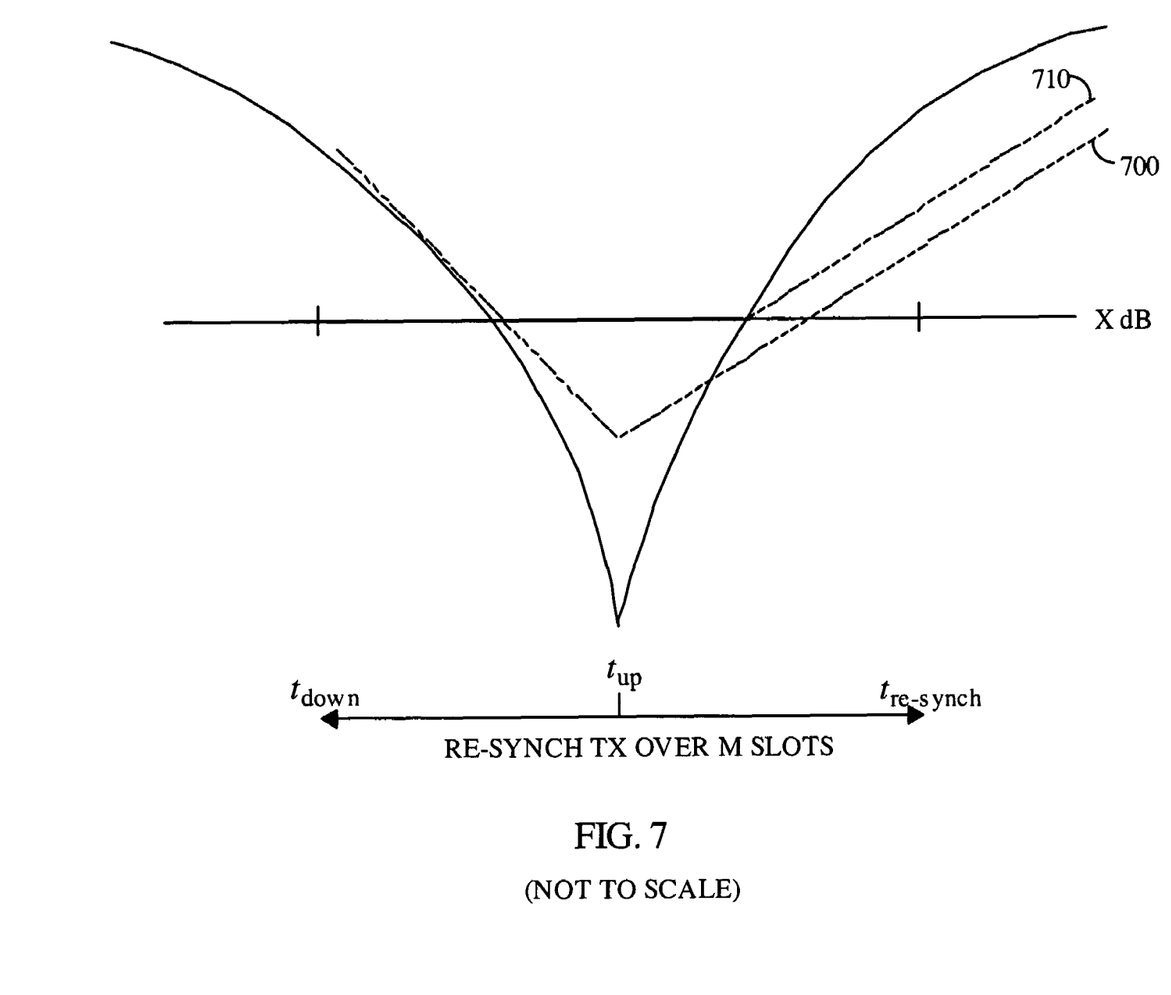
FIG. 7 is a graph illustrating an advantage of using the re-synch subchannel and the differential feedback subchannel at quantization limits.

FIG. 7 illustrates the benefit of these embodiments. A fading curve is shown against a threshold value X dB. If the fade dips below the threshold, then the remote station transmits the representation of the threshold value X dB on the re-synch subchannel and down bits on the differential feedback subchannel. If the down bits where taken into account, then a situation arises wherein up bits could be transmitted before the transmission of the full C/I value on the re-synch subchannel. The estimate of the fade would follow line 700 until the re-synch message is received at point $t_{re-synch}$. However if the down bits were not taken into account, then the transmission of up bits would commence at point $t_{up}$. The estimate of the fade would follow line 710 until the re-synch message is received at point $t_{re-synch}$. As one may observe, line 710 is a better approximation of the fading condition than line 700. Hence, implementation of this embodiment improves the ability of the base station to track the channel conditions.

The use of a threshold for updating the channel state information registers has an additional benefit: the effects of bit errors on the differential feedback subchannel are mitigated because the base station can be configured to recognize the pattern of constant up bits or constant down bits on the differential feedback subchannel. In other words, if the threshold value is transmitted, and the incremental values are constant for the duration that the threshold value is exceeded, then the base station will know that an occasional, isolated bit that is different from the expected, constant stream of bits is an error.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, an apparatus for scheduling forward link transmissions, comprising:
    a memory element; and
    a processing element configured to execute a set of instructions stored on the memory element, the set of instructions for:
        receiving a full channel quality value and a plurality of incremental channel quality values from a remote station, wherein the full channel value is received concurrently with more than one incremental channel quality value and wherein the plurality of incremental channel quality values are received sequentially; and
        selectively updating a register with a channel quality estimate, wherein the channel quality estimate is based upon the full channel quality value and the plurality of incremental channel quality values, and wherein selectively updating the register with the channel quality estimate comprises:
            sequentially adding the plurality of incremental channel quality values to the contents of the register;
            resetting the register with the full channel quality value when the full channel value is received;
            summing a portion of the plurality of incremental channel quality values; and
            adding the summed portion of the plurality of incremental channel quality values to the full channel quality value set in the register; and
    scheduling forward link transmissions in accordance with the updated register.

2. A method for estimating forward link channel quality from a full channel quality value and a plurality of incremental channel quality values, comprising:
    decoding the full channel quality value over a plurality of slots;
    incrementally updating a channel state register with the plurality of incremental channel quality values, wherein each of the plurality of incremental channel quality values are received separately over each of the plurality of slots;
    resetting the channel state register with the full channel quality value when the full channel quality value is fully decoded;
    summing a portion of the plurality of incremental channel quality values; and
    adding the summed portion of the plurality of incremental channel quality values to the full channel quality value stored in the channel state register.

3. A method for estimating forward link channel quality from a full channel quality value and a plurality of incremental channel quality values, comprising:
    decoding the full channel quality value over a plurality of slots;
    incrementally updating a channel state register with the plurality of incremental channel quality values, wherein each of the plurality of incremental channel quality values are received separately over each of the plurality of slots;
    resetting the channel state register with the full channel quality value when the full channel quality value is fully decoded;
    summing the plurality of incremental channel quality values; and
    adding the summed plurality of incremental channel quality values to the full channel quality value stored in the channel state register.

4. A method for estimating forward link channel quality from a full channel quality value and a plurality of incremental channel quality values, comprising:
    decoding the full channel quality value over a plurality of slots;
    incrementally updating a channel state register with the plurality of incremental channel quality values, wherein each of the plurality of incremental channel quality values are received separately over each of the plurality of slots; and
    resetting the channel state register with the full channel quality value when the full channel quality value is fully decoded, wherein if the full channel quality value cannot be decoded, then using the plurality of incremental channel quality values as the forward link channel quality.

* * * * *